(12) United States Patent
Hansson et al.

(10) Patent No.: US 7,828,308 B2
(45) Date of Patent: Nov. 9, 2010

(54) STABILISER BAR FOR A VEHICLE

(75) Inventors: Örjan Hansson, Göteborg (SE); Leon Fuks, Angered (SE)

(73) Assignee: Volvo Lastvagnar AB, Góoteborg (SE)

( * ) Notice: Subject to any disclaimer, the term of this patent is extended or adjusted under 35 U.S.C. 154(b) by 76 days.

(21) Appl. No.: 12/295,421

(22) PCT Filed: Apr. 25, 2007

(86) PCT No.: PCT/SE2007/000402

§ 371 (c)(1),
(2), (4) Date: Sep. 30, 2008

(87) PCT Pub. No.: WO2007/126359

PCT Pub. Date: Nov. 8, 2007

(65) Prior Publication Data
US 2009/0134592 A1    May 28, 2009

(30) Foreign Application Priority Data
Apr. 28, 2006  (SE) .................................... 0600953

(51) Int. Cl.
B60G 21/055 (2006.01)

(52) U.S. Cl. ........................... 280/124.152; 267/140.12

(58) Field of Classification Search .......... 280/124.107, 280/124.166, 124.169, 124.152; 267/276, 267/293, 140.12, 141.2, 141.4
See application file for complete search history.

(56) References Cited

U.S. PATENT DOCUMENTS

| 5,884,926 | A  | * | 3/1999 | Muzio et al. ........... 280/124.107 |
| 6,206,392 | B1 | * | 3/2001 | Siecinski et al. ...... 280/124.166 |
| 6,893,034 | B2 | * | 5/2005 | Fader ................. 280/124.166 |
| 2005/0029769 | A1 | * | 2/2005 | Furuyama et al. ..... 280/124.107 |
| 2006/0091595 | A1 | * | 5/2006 | Hayashi et al. ............. 267/276 |

FOREIGN PATENT DOCUMENTS

EP    0496949 A1    8/1992

(Continued)

OTHER PUBLICATIONS

International Search Report for corresponding International Application PCT/SE2007/000402.

(Continued)

*Primary Examiner*—Faye M. Fleming
*Assistant Examiner*—Joseph Rocca
(74) *Attorney, Agent, or Firm*—WRB-IP LLP

(57) ABSTRACT

A stabilizer bar assembly for a suspension arrangement in a vehicle has a first diameter D1. The stabilizer bar assembly includes a first housing with a resilient first bushing and a second housing with a resilient second bushing allowing pivotal movement of the stabilizer bar about the first and second housings. The stabilizer bar include a receiving arrangement for the first bushing, the receiving arrangement including a pair of bulges each having at their apexes a second diameter D2 exceeding the first diameter D1. The receiving arrangement includes two peripheral surfaces inclining towards a midsection with a decreasing cross-sectional area from the apex of the bulges to the midsection. The first bushing and the second bushing are the same. A stabilizer bar with or without the receiving means can be mounted with the same bushings.

16 Claims, 5 Drawing Sheets

FOREIGN PATENT DOCUMENTS

| EP | 0770506 | A1 | 5/1997 |
| EP | 0805055 | A1 | 11/1997 |
| EP | 1502780 | A1 | 2/2005 |
| FR | 85786 | E | 10/1965 |
| JP | 63287616 | A | 11/1988 |
| JP | 9280286 | A | 10/1997 |
| JP | 11108096 | A | 4/1999 |

OTHER PUBLICATIONS

European Search Report for corresponding EP 07 74 8067.

* cited by examiner

STABILISER BAR FOR A VEHICLE

BACKGROUND AND SUMMARY

The invention refers to a stabilizer bar assembly for a suspension arrangement in a vehicle. The stabilizer bar assembly comprises a torsion bar extending essentially in a cross vehicle direction and two level arms extending on both ends of the torsion bar extending at an angle to the torsion bar. The torsion bar has an essentially circular cross-sectional area with a first diameter. The torsion bar is mounted to a suspension arrangement via two housings each comprising a resilient bushing allowing pivotal movement of the stabilizer bar about the housing. The housing and the bushings are designed for use with the cylindrical torsion bar A stabilizer bar is commonly cylindrical and the corresponding bushings each have an essentially cylindrical inner surface. The purpose of a stabilizer bar, also called antiroll bar, is to improve the torsional stiffness of the suspension, especially when cornering or driving on uneven ground. One problem with such an arrangement is that axial movements occur due to movement of the suspension caused by movement of the wheels of the vehicle, which may cause the stabilizer bar to displace with regards to the bushings. This axial movement is not desired because if the stabilizer bar has a non-symmetrical disposition with respect to the suspension arrangement, the driving properties of the vehicle will deteriorate. However, a small axial movement is desirable in order to take up and/or dampen vibrations.

The problem with axial movements of the stabilizer bar is often found on heavy vehicles, such as trucks or buses, where high loads are placed on the components. Heavy vehicles are also subjected to higher forces than e.g. passenger cars.

Different solutions to prevent axial displacement of the stabilizer bar are known in the art.

One solution is to provide flanges on the stabilizer bar positioned on each side of the bushing in order to prevent movement of the stabilizer bar. JP 2003237338 gives an example of this solution. One disadvantage with this solution is that the flanges are welded to the stabilizer bar which may influence the properties of the stabilizer bar.

Another solution is to provide a V-shape or a groove in the stabilizer bar that interacts with a correspondingly shaped bushing. The V-shape or groove will act as a receiving means for the corresponding bushing. The receiving means have a V-shaped or grooved cross-sectional area taken along the axial direction. The corresponding bushings each have a corresponding V-shaped cross-sectional area taken along the axial direction. EP 0496949, EP 0805055 and JP 2005212780 give different examples of this solution.

One disadvantage with these solutions is the need to use one set of bushings for a stabilizer bar with a V-shape or a groove and another set of bushings for a standard stabilizer bar. If only one side of the stabilizer bar is provided with a V-shape or a groove, different bushings have to be used for the different sides of the same stabilizer bar. Different bushings mean higher cost and more part numbers. It is important, especially for a company that produces several different types of vehicles, to limit the number of part numbers.

Another problem with these solutions, especially with the arrangement according to EP 496949, is that the pair of receiving means puts high demand on tolerances upon assembly of the arrangement. Such demands yields high costs and if the tolerances are not met, the arrangement will not function properly and will result in a difficult service operation. A further problem is that the V-shaped units have a special design which has to be taken into consideration both during manufacturing and when to be replaced.

A further disadvantage with a V-shaped groove is that the V-shape provides a sharp strain transition area for the torsion forces which may lead to a lower breaking stress in that area.

In the vehicle industry a lot of vehicles are produced using the same components (standard components) for both same and different vehicle models. In case of changes of a structure comprising a number of components, it is therefore important to limit the changes to as few new components as possible This will minimise the changes in the production and the production cost is thus kept to a minimum. Furthermore, using standard components makes it easy to replace parts during service of the vehicle and for the repair shops to keep spare parts in store. Standard components also keep the cost down for the production of the spare parts per se due to large production series.

There is thus a need for an improved stabilizer bar assembly hindering large axial movements but allowing smaller axial movement, using mostly standard components.

The invention refers to a stabilizer bar assembly in a suspension arrangement in a vehicle. The suspension arrangement is arranged to balance a wheel pair. The stabilizer bar assembly comprises a stabilizer bar comprising a torsion bar extending essentially in a cross vehicle direction and two level arms extending on both ends of the torsion bar extending at an angle to the torsion bar. The level arms may extend in any suitable form, for example in a straight or curved from. The term "cross vehicle direction" is used in order to clarify the position of the stabilizer bar mounted to a vehicle. However, when the stabilizer bar is not mounted to a vehicle the wording "cross vehicle direction" shall be understood to mean that the torsion bar has an extension in an arbitrary direction and the level arms extends at an angle to this direction.

The torsion bar has an essentially circular cross-sectional area with a first diameter $D1$. The stabilizer bar assembly comprises two housings each comprising a resilient bushing. The bushings accommodate the torsion bar and allow pivotal movement of the stabilizer bar about the housing. The torsion bar is intended to be attached to a suspension arrangement via the two housings comprising the resilient bushings. The housing and the bushings are designed for use with the torsion bar being essentially cylindrical in at least those parts engaging the bushings.

The torsion bar refers to a laterally extending bar being designed to take up unevenly distributed forces from the wheel pair, with the intention to level the wheel pairs as much as possible. For example, when a first wheel in the wheel pair moves in a vertical direction, the level arm connected to the corresponding suspension arrangement moves in a pivotal movement about the bushings. The torsion bar is affected by this movement by a torsional force affecting the other level arm such that the other level arm rotates in a pivotal movement about the bushings. The other level arm affects the suspension arrangement and thus the second wheel to perform a similar motion as the first wheel. The stabilizer bar assembly together with the suspension arrangement thus intends to keep the wheel pair level but at the same time to allow an individual and dynamic motion of the wheels.

One advantage of the invention is that the same bushing is adapted for use with an essentially cylindrical torsion bar, and also for use with a receiving means according to the invention. Thus, only one type of bushing is required for the assembly. The bushing is resilient and fitted in and around the receiving means of the torsion bar according to the invention. The other bushing engages a still cylindrical part of the torsion bar.

The receiving means comprises a pair of bulges each having a circular cross-sectional area and, having at their apexes, a second diameter D2 exceeding the first diameter D1. The receiving means comprises between the bulges a midsection having an essentially constant third diameter D3. The bulges comprise two peripheral surfaces inclining towards the midsection with a decreasing cross-sectional area from the apex of the bulge to the midsection. The bushing is fitted into and around the receiving means between the bulges.

One advantage of the idea is that the bushing designed for use with a cylindrical torsion bar may also be used together with the torsion bar having a receiving means according to above. The use of the same bushings reduces costs and simplifies the modification of a stabilizer bar assembly having no receiving means, with the previously stated problems with axial movement, to the inventive stabilizer bar assembly comprising the receiving means. Thus, the same bushings may be used on all different versions of the vehicle, and depending on the type of vehicle, a stabilizer bar with or without receiving means are installed.

Another advantage of the idea is that the use of only one receiving means takes away any demand on tolerance which would occur should the stabilizer bar be equipped with two receiving means. The inventive stabilizer bar assembly is hindered from large axial movement by the single bushing cooperating with the single receiving means. Furthermore, the stabilizer bar is allowed a small advantageous axial movement due to the cooperation between the bushing and the receiving means.

A suitable bushing can be made from a resilient material such as rubber, plastic or any other suitable resilient material.

A suitable bushing comprises an inner cross-sectional area adapted to fit a torsion bar having a circular cross-sectional area. The bushing can be made in one piece comprising an axial slit enabling the bushing to be forced open in order to be able to be fitted over the torsion bar. The bushing can also be made in the form of two pieces fitted onto the torsion bar on opposite sides and then fitted into the housing.

The housing is adapted for use with the bushing designed for the cylindrical torsion bar and could not be used together with any arbitrary form of the receiving means. Each bushing comprises an essentially circular cross-sectional inner envelope surface arranged for use with an essentially cylindrical torsion bar before being fitted into and around the receiving means. The housing therefore has an essentially circular cross-sectional inner envelope surface adapted for use with a cylindrical torsion bar via the bushing.

However, the inner envelope surface of the housing may comprise grooves and elevated portions arranged to match corresponding grooves and elevated portions in an outer envelope surface of the bushing. The bushing is fixed in the housing by the corresponding grooves and elevated portions engaging each other during use such that the bushing cannot move in the axial direction of the torsion bar in relation to the housing. The bushing may also be fixed in the housing with another suitable engagement means. Furthermore, the housing may comprise a top piece and a bottom piece secured to each other via a bolt connection in order to gain an easy assembly operation.

The form of the receiving means is important for the invention in order to gain the advantage of using the bushing designed for a cylindrical torsion bar when hindering large axial movements but allowing small axial movements.

The apex of the bulges is advantageously positioned on either side of the bushing so that the flexible bushing is fitted between the peripheral surfaces and the housing. The distance between the torsion bar and the housing diminishes from the mid-section towards the bulge apex. The diminished distance gives the effect that a part of the bushing is compressed during an axial movement of the torsion bar relative the housing. The part of the bushing being compressed is a side portion of the bushing being positioned between the peripheral surface and the housing. The peripheral surfaces may incline linearly or non-linearly, but in both cases the side portions of the resilient bushing is deformed non-linearly upon axial movement of the torsion bar. This is an advantage because the torsion bar is allowed a small axial movement, which is an advantage, for example, in order to allow small vibrations. If small axial movements would not be allowed, for example vibrations, in a too rigid arrangement, this would cause too much strain on the housing and on the bushing and in the attachment point of the chassis.

One advantage of the form of the receiving means is that the midsection affects the bushing in the same way as would a cylindrical torsion bar. The bushing lodges the torsion bar slidably in the midsection thereby giving the torsion bar a possibility to perform lateral/axial movement due to, for example, vibrations. Furthermore, the compression of the bushing allows a small axial movement, but when the bushing is compressed up to a certain level the axial movement is hindered.

The form of the receiving means together with the bushing thus gives the advantage that large axial movement of the stabilizer bar is hindered but that a small axial movement is allowed.

The bulges are advantageously formed when the stabilizer bar is forged. It would also be possible to provide the bulges in the form of units being attached to a cylindrical torsion bar via any conventional attachment means, for example, via welding, shrinkage fit, etc. Care should in this case be taken not to influence the mechanical properties of the stabilizer bar when attaching the bulges.

In one embodiment of the invention, the midsection forms an essentially cylindrical part of the receiving means.

BRIEF DESCRIPTION OF DRAWINGS

The invention will below be described in connection to a number of drawings, where.

DETAILED DESCRIPTION

Figure 1:
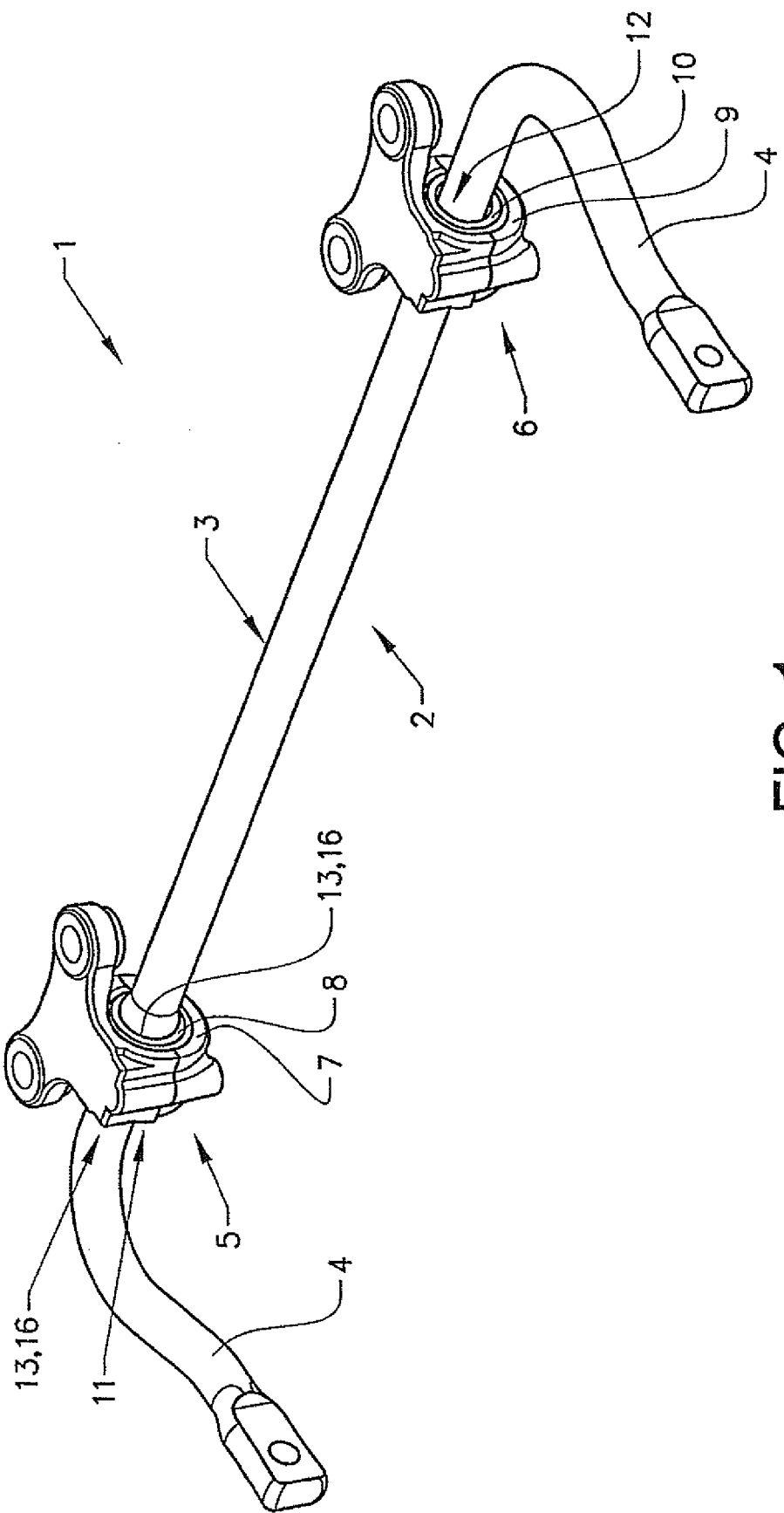
FIG. 1 schematically shows a stabilizer bar assembly according to the invention.

FIG. 1 schematically shows a stabilizer bar assembly 1 according to the invention. The stabilizer bar assembly 1 comprises a stabilizer bar 2 comprising a torsion bar 3 extending essentially in a cross vehicle direction and two level arms 4 extending on both ends of the torsion bar 3. The torsion bar 3 is intended to be secured to a suspension arrangement (not shown) via a first and a second bearing arrangement 5, 6. The first bearing arrangement 5 comprises a first housing 7 comprising a first bushing 8 and where the second bearing arrangement 6 comprises a second housing 9 comprising a second bushing 10. The first and second bearing arrangements 5, 6 are designed for use with a cylindrical torsion bar 3. The torsion bar 3 is accommodated in the first and second bushings 8, 10. The first and second bearing arrangements 5, 6 allow pivotal movement of the stabilizer bar 2 about the first and second bearing arrangements 5, 6.

The torsion bar 3 has one receiving means 11 cooperating with the first bearing arrangement 5. The second bearing arrangement 6 cooperates with a cylindrical part 12 of the torsion bar 3.

Figure 2:
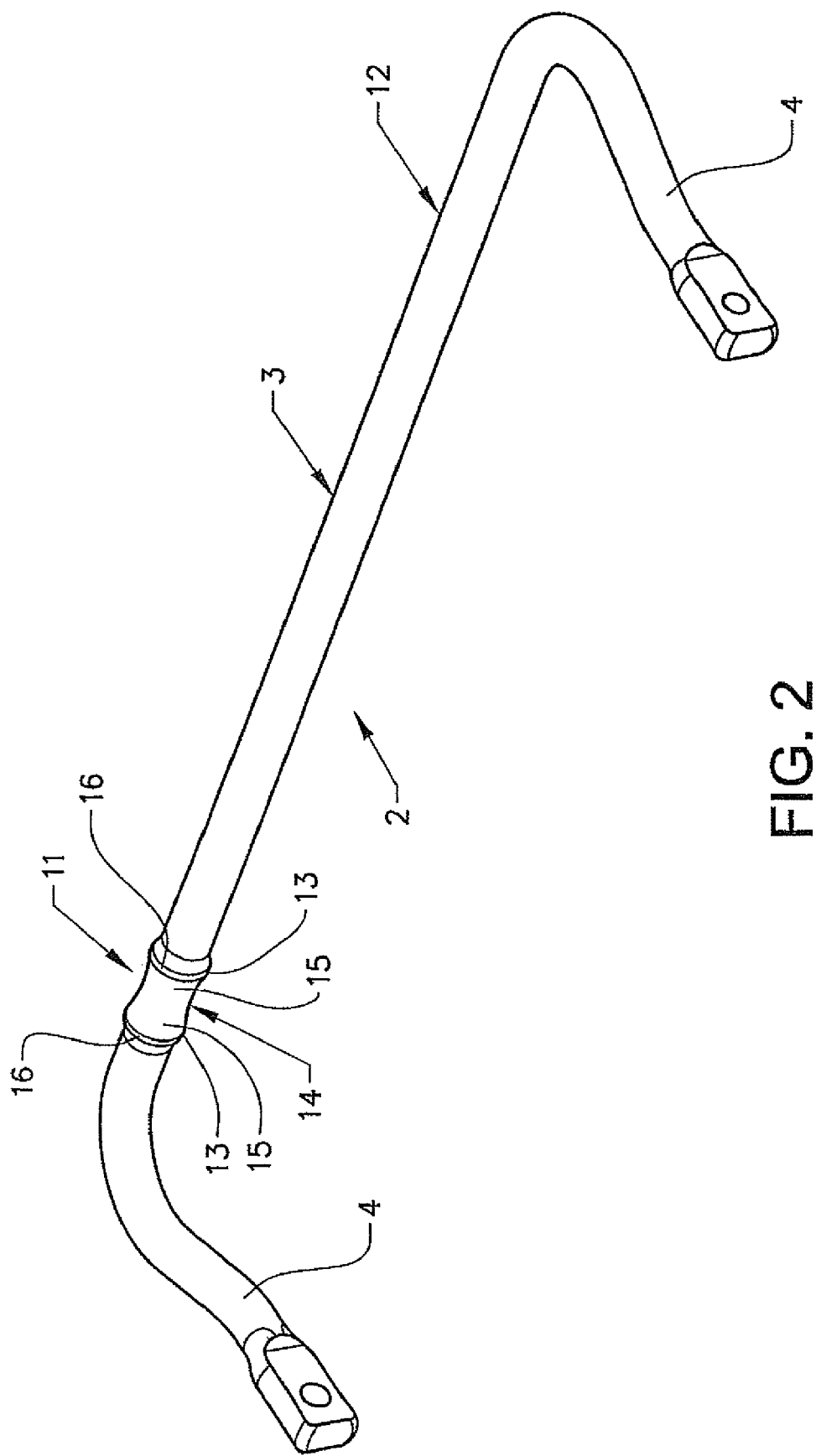
FIG. 2 schematically shows a stabilizer bar according to FIG. 1.

FIG. 2 schematically shows a stabilizer bar 2 according to FIG. 1. The receiving means 11 is positioned at a distance from one of the level arms 4. The receiving means 11 comprises a pair of bulges 13 and a midsection 14 between the bulges 13. The receiving means 11 comprise two peripheral surfaces 15 inclining from the bulges 13 towards the midsection 14.

Figure 3:
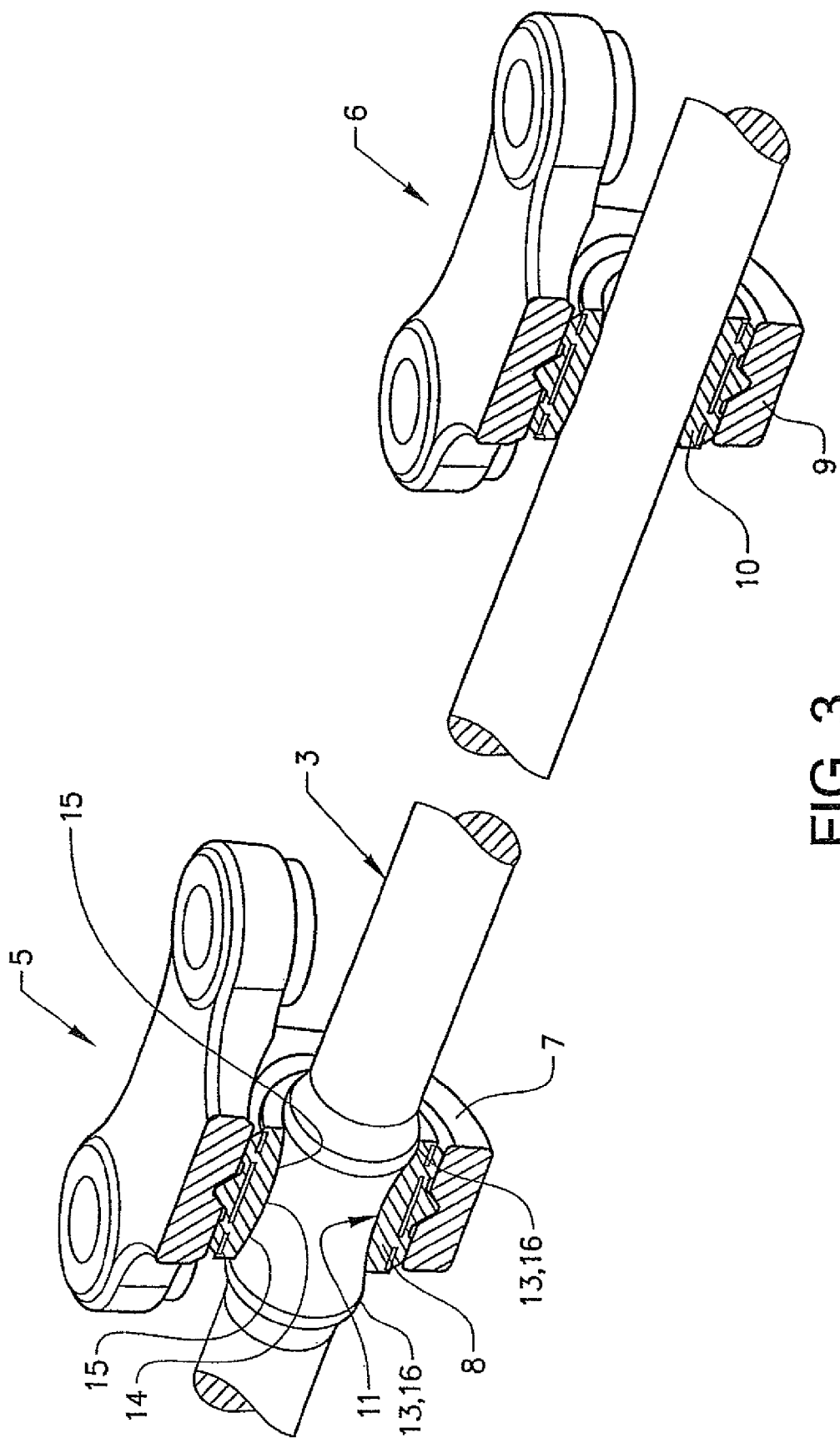
FIG. 3 schematically shows a cross-section of the stabilizer bar assembly according to FIG. 1, and where.

FIG. 3 schematically shows a cross-section of the stabilizer bar assembly 1 according to FIG. 1. The first bearing arrangement 5 accommodates a part of the torsion bar 3 being modified compared to an essentially cylindrical torsion bar 3. The modified torsion bar 3 has been modified by the introduction of the receiving means 11. The first bushing 8 of the first bearing assembly 5 thus lodges the torsion bar 3 in a non-displaceable manner in the axial direction.

FIG. 3 also shows that the second bushing 10 in the second bearing arrangement 6 accommodates a part of the torsion bar 3 being essentially cylindrical. The second bearing arrangement 6 thus lodges the torsion bar 3 slidably in the axial direction.

Figure 4:
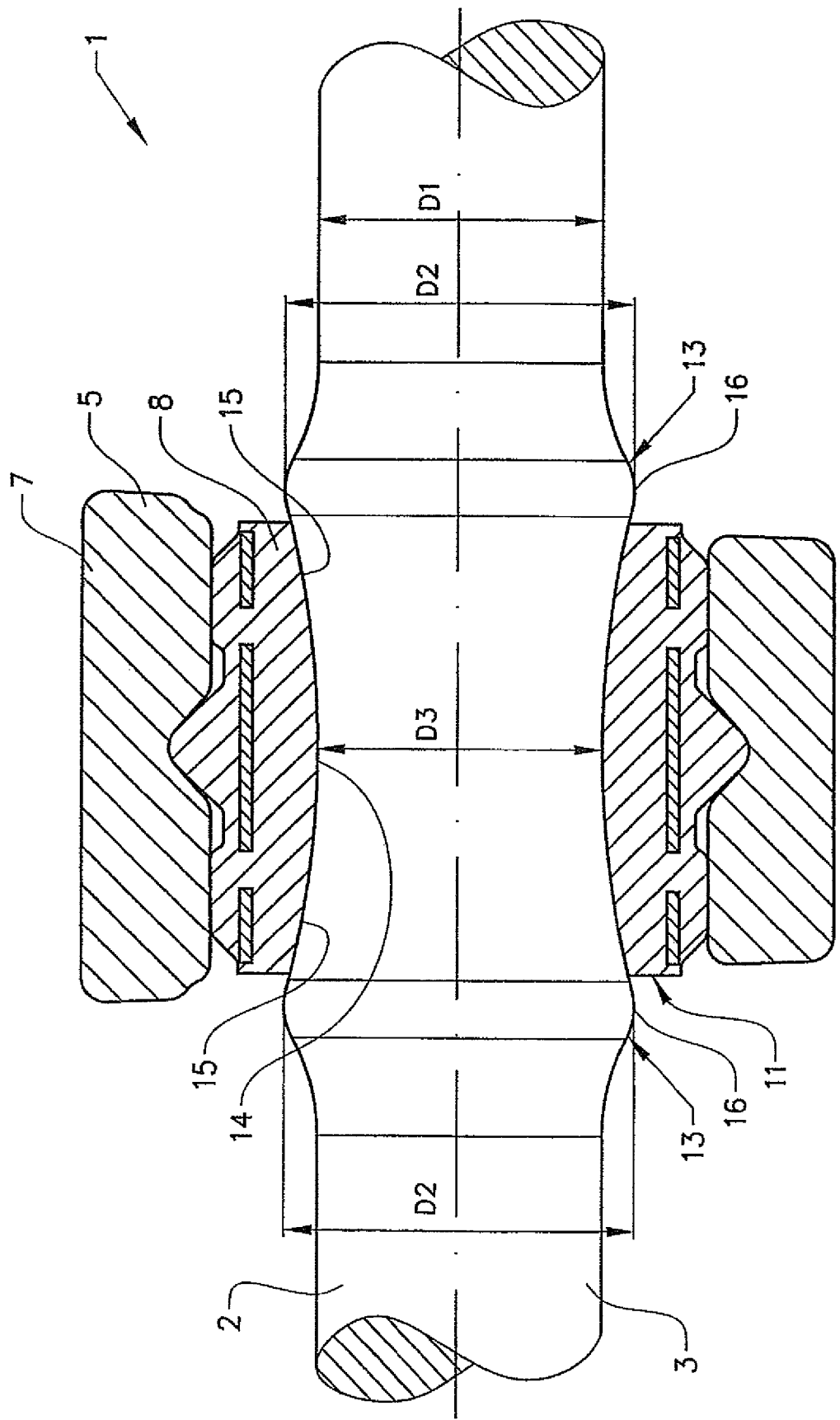
FIG. 4 schematically shows a magnified part of FIG. 3 comprising a receiving means cooperating with a bushing and a housing.

FIG. 4 schematically shows a magnified part of FIG. 3 comprising a receiving means 11 cooperating with the first bushing 8 and the first housing 7.

The torsion bar 3 has a first diameter D1, the bulges 13 each have at their apexes 16 a second diameter D2 and the midsection 14 has a third diameter D3. The third diameter D3 of the midsection 14 substantially corresponds to the first diameter D1 of the torsion bar 3 and the maximum second diameter D2 of the bulges 13 at the apexes 16 exceeds the third diameter D3 and the first diameter D1

The peripheral surfaces 15 each has the form of a funnel shaped surface with a decreasing cross-sectional area from the apexes 16 of the bulges 13 to the midsection 14. The midsection 14 is substantially flat and may have a cylindrical extension between the peripheral surfaces 15. However, FIG. 4 shows the midsection 14 as a transition portion between the peripheral surfaces 15 where a tangent to the peripheral surfaces 15 has a gradient of line changing from negative to positive at the midsection 14. The peripheral surfaces 15 cannot have an arbitrary shape, but must have a shape that can accommodate the first bushing 8 being designed for use also with a cylindrical rod.

FIG. 4 shows that the resilient first bushing 8 is compressed between the peripheral surfaces 15 and the first housing 6. The resilient first bushing 8 cannot be compressed in a too large extent why the form of the peripheral surfaces 15 is important. Since the third diameter D3 of the midsection 14 substantially corresponds to the first diameter D1 of the torsion bar 3, the first bushing is not compressed in the midsection 14 more than the second bushing is comprised in the second bearing arrangement 6 accommodating the cylindrical part of the torsion bar 3.

Figure 5A:
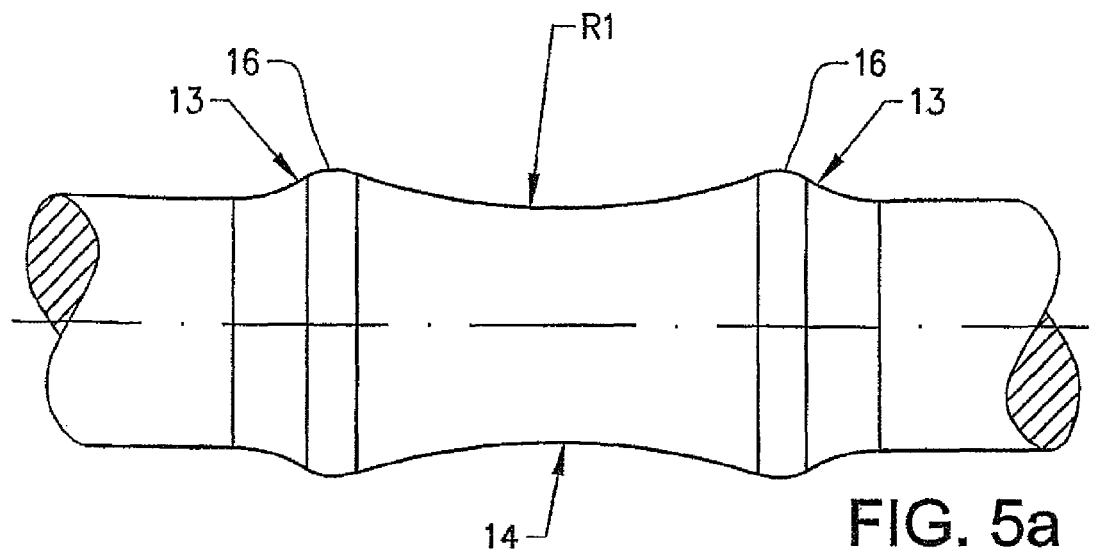
FIG. 5 schematically shows different embodiments of the receiving means.
Figure 5B:
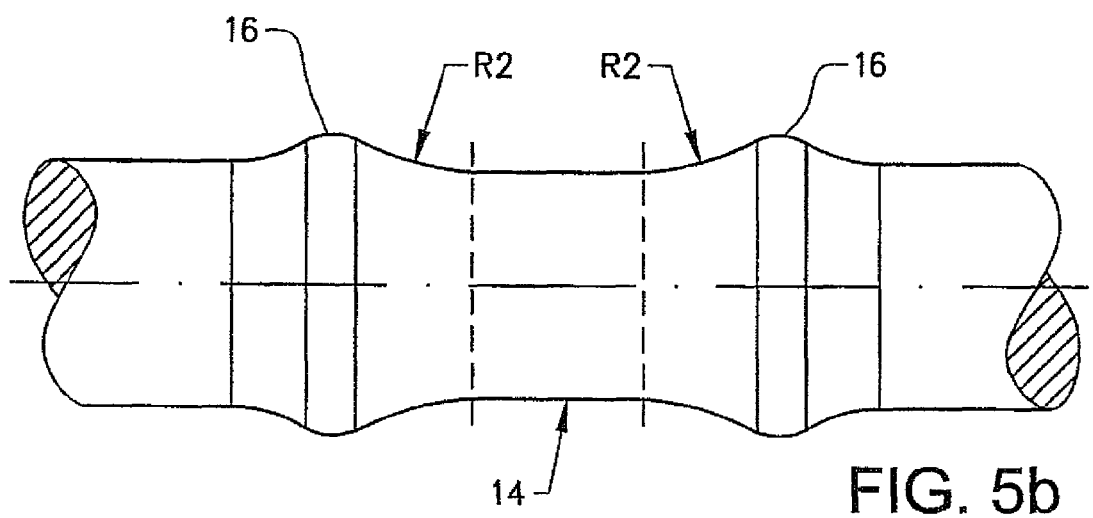
Figure 5C:
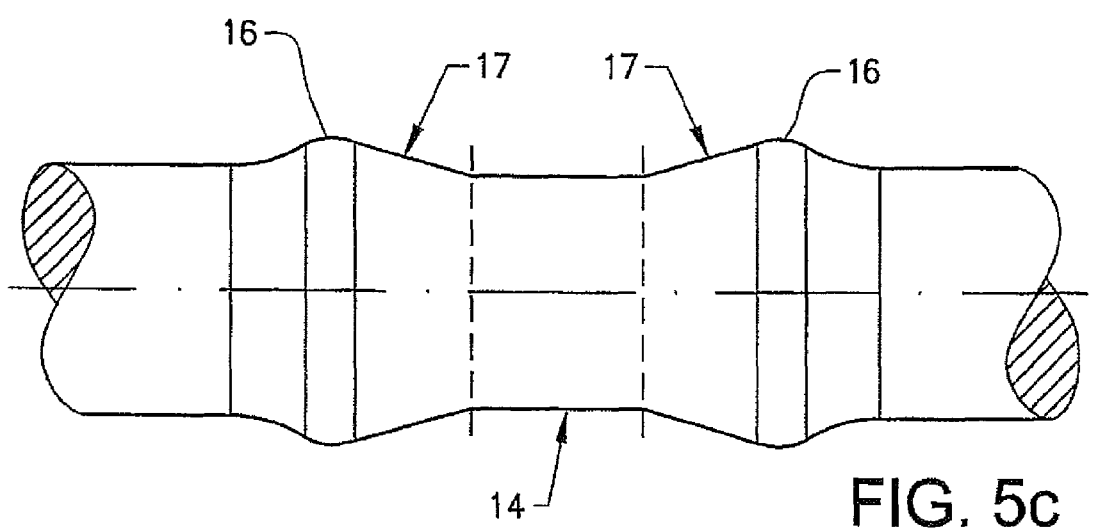

FIG. 5 shows different embodiments for the receiving means 11. In 5a, the receiving means 11 comprises a radius R1 between the apexes 16. Since the radii R1 is be rather large, a short part of the midsection will be substantially flat. In 5b, the receiving means 11 comprises the peripheral surfaces 15 as two inclined areas with radii R2 and a flat midsection 14 extending over approximately half of the receiving means 11 or up to approximately 75% of the width of the receiving means. In 5c, the receiving means 11 comprises the peripheral surfaces 15 as two inclined straight areas 17 and a flat midsection 14 extending over approximately half of the receiving means or up to approximately 75% of the width of the receiving means.

The relation between the size of the bulges and the diameter of the stabilisation bar, i.e. D1 and/or D3, is chosen so that the compression ratio of the bushing is within a predefined limit. The bushing holding the stabilizer bar end without a receiving means is compressed within this predefined limit when mounted. The bushing holding the end with the receiving means should also be compressed within the predefined limit. The difference in compression between the first and the second bushing is preferably in the region of 10-30%.

The inclination of the bulge towards the mid section, i.e. the slope, is chosen depending on the desired axial behaviour of the bushing.

The invention is not to be regarded as being limited to the embodiments described above, a number of additional variants and modifications being possible within the scope of the subsequent patent claims.

The invention claimed is:

1. A stabilizer bar assembly for a suspension arrangement in a vehicle, the stabilizer bar assembly comprising
a stabilizer bar comprising
a torsion bar extending essentially in a cross vehicle direction and
two level arms extending on both ends of the torsion bar at an angle to the torsion bar, the torsion bar having an essentially circular cross-sectional area with a first diameter,
a first housing comprising a resilient first bushing and
a second housing comprising a resilient second bushing, the first and second housings accommodating the torsion bar and allowing pivotal movement of the stabilizer bar about the first and second housings,
the first and second housings and the first and second bushings being designed for use with the cylindrical torsion bar,
wherein the torsion bar comprises one receiving means for the first bushing, the receiving means comprising a pair of bulges each having at their apexes a second diameter exceeding the first diameter, the receiving means comprising between the bulges a midsection having an essentially constant third diameter, the receiving means comprising two peripheral surfaces inclining towards the midsection with a decreasing cross-sectional area from the apex of the bulges to the midsection, the first bushing being fitted around the receiving means between the bulges, wherein the first bushing contacts the torsion bar only along an interior surface of the first bushing and not along radially extending ends of the first bushing.

2. A stabilizer bar assembly according to claim 1, wherein the third diameter of the midsection is substantially equal to the first diameter of the torsion bar, the second diameter of the bulges at the apexes exceeding the first diameter and the third diameter.

3. A stabilizer bar assembly according to claim 2, wherein the receiving means comprises a radius R1 between the apexes.

4. A stabilizer bar assembly according to claim 2, wherein the receiving means comprises two inclined areas with radii R2 and a flat midsection.

5. A stabilizer bar assembly according to claim 1, wherein the receiving means comprises a radius R1 between the apexes.

6. A stabilizer bar assembly according to claim 1, wherein the receiving means comprises two inclined areas with radii R2 and a flat midsection.

7. A stabilizer bar assembly according to claim 6, wherein the flat midsection extends over approximately half of the receiving means.

8. A stabilizer bar assembly according to claim 6, wherein the flat midsection extends over the receiving means between 25% to 75% of the width of the receiving means.

9. A stabilizer bar assembly according to claim 1, wherein the receiving means comprises two inclined straight areas and a flat midsection.

10. A stabilizer bar assembly according to claim 9, wherein the flat midsection extends over approximately half of the receiving means.

11. A stabilizer bar assembly according to claim 9, wherein the flat midsection extends over the receiving means between 25% to 75% of the width of the receiving means.

12. A stabilizer bar assembly according to claim 1, wherein the level arms extends on both ends of the torsion bar essentially perpendicular to the torsion bar.

13. A stabilizer bar assembly according to claim 1, wherein each of the first and second bushings comprise an essentially circular cross-sectional inner envelope surface adapted for use with an essentially cylindrical torsion bar before being fitted into and around the receiving means.

14. A stabilizer bar assembly according to claim 1, wherein the first and second bushing are substantially identical.

15. A stabilizer bar assembly according to claim 1, wherein the receiving means is shaped so that peripheral ends of the first bushing contacting the peripheral surfaces of the receiving means are compressed about 10-30% greater than a midsection of the first bushing contacting the midsection of the receiving means.

16. A stabilizer bar with a first diameter comprising a receiving means adapted for cooperation with a first bushing, the receiving means comprising a pair of bulges having a cylindrical cross-sectional area having a second diameter at their apexes, a midsection between the bulges, and two peripheral surfaces inclining from the apexes to the midsection, the stabilizer bar further comprising a cylindrical part having a constant diameter adapted for cooperation with a second bushing, wherein the first and second bushings are substantially identical and the receiving means is shaped so that peripheral ends of the first bushing contacting the peripheral surfaces of the receiving means are compressed about 10-30% greater than a midsection of the first bushing contacting the midsection of the receiving means.

* * * * *